(12) United States Patent
Sui et al.

(10) Patent No.: US 11,780,038 B2
(45) Date of Patent: Oct. 10, 2023

(54) CLAMPING DEVICE AND MACHINING METHOD

(71) Applicant: CHENGDU AIRCRAFT INDUSTRIAL (GROUP) CO., LTD., Sichuan (CN)

(72) Inventors: Shaochun Sui, Chengdu (CN); Wenping Mou, Chengdu (CN); Xin Gao, Chengdu (CN); Weidong Li, Chengdu (CN); Ge Song, Chengdu (CN); Xin Shen, Chengdu (CN); Li Zhou, Chengdu (CN); Bin Feng, Chengdu (CN)

(73) Assignee: CHENGDU AIRCRAFT INDUSTRIAL (GROUP) CO., LTD, Sichuan (CN)

( * ) Notice: Subject to any disclaimer, the term of this patent is extended or adjusted under 35 U.S.C. 154(b) by 0 days.

(21) Appl. No.: 17/911,709

(22) PCT Filed: Mar. 25, 2020

(86) PCT No.: PCT/CN2020/081110
§ 371 (c)(1),
(2) Date: Sep. 15, 2022

(87) PCT Pub. No.: WO2021/189297
PCT Pub. Date: Sep. 30, 2021

(65) Prior Publication Data
US 2023/0122591 A1 Apr. 20, 2023

(51) Int. Cl.
*B25B 5/06* (2006.01)
*B23Q 3/10* (2006.01)
*B23Q 3/08* (2006.01)

(52) U.S. Cl.
CPC .............. *B23Q 3/082* (2013.01); *B23Q 3/108* (2013.01); *B25B 5/062* (2013.01); *B23Q 2240/002* (2013.01); *B25B 5/061* (2013.01)

(58) Field of Classification Search
CPC ......... B25B 5/062; B25B 5/064; B25B 5/061; B23Q 3/082; B23Q 3/108; B23Q 2240/002
See application file for complete search history.

(56) References Cited

U.S. PATENT DOCUMENTS 6,113,086 A * 9/2000 Yonezawa ................. B25B 5/06
269/27
6,663,093 B2 * 12/2003 Yonezawa ............... B25B 5/062
269/27

(Continued)

FOREIGN PATENT DOCUMENTS

CN          209007094          6/2019
WO    WO 2019068668 A1 *    4/2019
WO    WO2022223369 A1 *    10/2022

*Primary Examiner* — Mahdi H Nejad
(74) *Attorney, Agent, or Firm* — Michael J. Feigin, Esq.; Feigin and Fridman LLC

(57) ABSTRACT

A clamping device and a machining method. The clamping device comprises: a base; a clamping head comprising a blind rivet and a locking member, the blind rivet comprising a middle column segment and enlarged portions at two ends, and the locking member being connected to an upper end of the blind rivet and defining a clamping opening; a lower cavity connected to the base; an upper cavity comprising an annular peripheral wall and a top wall having a central hole, the top wall being clamped between the two enlarged portions, the middle column segment of the blind rivet movably passing through the central hole, and the upper cavity being connected to the lower cavity in a fit manner; an elastic member located in the peripheral wall and supported between the enlarged portion at a lower portion of the (Continued)

blind rivet and the top wall; and a support cylinder movably fitted in the lower cavity, the support cylinder being supported below the elastic member.

9 Claims, 4 Drawing Sheets

(56) References Cited

U.S. PATENT DOCUMENTS

| | | | |
|---|---|---|---|
| 7,059,594 B2* | 6/2006 | Kawakami | B23Q 11/005 269/309 |
| 2003/0090047 A1* | 5/2003 | Yonezawa | F15B 15/063 269/24 |
| 2005/0206059 A1* | 9/2005 | Hausler, III | B25B 5/062 269/24 |

* cited by examiner

CLAMPING DEVICE AND MACHINING METHOD

TECHNICAL FIELD

The present invention relates to the technical field of clamping, and in particular to a clamping device and a machining method.

BACKGROUND ART

Under the action of a material residual stress, a cutting force, a clamping force and other factors, machining deformation often occurs in the machining of parts. The machining deformation of the parts is one of important reasons that affect the final machining quality of the parts.

However, an existing fixture cannot release the machining deformation of a part, affecting the forming quality of the part.

SUMMARY OF THE INVENTION

The present disclosure provides a clamping device in order to solve the problem that an existing fixture cannot well release the machining deformation of a part, affecting the forming quality of the part.

The present disclosure further provides a machining method using the aforementioned clamping device.

The embodiments of the present invention are implemented as follows:

the present disclosure is a clamping device, comprising a base, an adjustable assembly, and a clamping head mounted to the base by means of the adjustable assembly;

wherein the base comprises a base plate and an annular outer wall perpendicularly connected to the base plate, and an expansion sleeve is embedded into an inner peripheral face of the outer wall;

the adjustable assembly comprises a lower cavity, an upper cavity and a support cylinder;

the lower cavity comprises an annular enclosure wall and a bottom wall connected to a lower end opening of the enclosure wall, the enclosure wall is slidably fitted in the outer wall of the base and can be expanded and pressed against the outer wall by the expansion sleeve, the bottom wall is supported on the base plate in a spaced manner by means of a support member, and a lower fluid chamber is defined therebetween;

the support cylinder comprises a cylindrical portion opening downwards and an annular support wall located on the cylindrical portion, wherein the cylindrical portion is slidably fitted in the enclosure wall of the lower cavity and forms a fluid chamber with the lower cavity in an enclosed manner, the cylindrical portion of the support cylinder is fitted to a lower section of the enclosure wall of the lower cavity, and the outer peripheral face of the support wall of the support cylinder and an upper section of the enclosure wall of the lower cavity are spaced to define an annular space;

the bottom wall is provided with fluid through holes passing through upper and lower surfaces thereof, an upper surface of the base plate has a blind hole formed by recessing, and the blind hole and the fluid through holes are respectively in communication with the lower fluid chamber; a tube hole that is in communication with an outer peripheral face of the base plate and the blind hole is further provided in the base plate, and serves as a passage leading to the fluid chamber so as to adjust a vertical position of the support cylinder by introducing/discharging a fluid;

the upper cavity comprises an annular peripheral wall and a top wall formed extending inwards in a radial direction from an upper edge of the peripheral wall and having a central hole; the peripheral wall of the upper cavity is downwards slidably fitted in the annular space, an inner peripheral face of the upper section of the enclosure wall of the lower cavity is provided with a recessed annular groove, a lower edge of the peripheral wall of the upper cavity has a convex ring that is formed expanding outwards in the radial direction, and the peripheral wall of the upper cavity is limited between two end faces of the annular groove in an axial direction by means of the convex ring thereof;

the clamping head comprises a blind rivet and a locking member, wherein the blind rivet comprises a middle column segment and enlarged portions respectively connected to upper and lower ends of the middle column segment, the locking member is configured to be connectable to an upper end of the blind rivet, and a clamping opening for clamping a part is defined between the locking member and the blind rivet;

the top wall is clamped between the two enlarged portions of the blind rivet, and the middle column segment of the blind rivet movably passes through the central hole; a concave washer is provided between the inner peripheral face of the peripheral wall and the outer peripheral face of the middle column segment; a laminated spring as an elastic member is provided in the peripheral wall and is elastically supported between the top wall and the concave washer to elastically strut the concave washer and the peripheral wall between the enlarged portion at the lower portion of the blind rivet and the enlarged portion at the upper portion of the blind rivet;

the support wall of the support cylinder is located between the peripheral wall of the upper cavity and the enlarged portion at the lower portion of the blind rivet and is vertically supported at the lower end of the elastic member;

the diameters of the central hole, an inner hole of the elastic member and an inner hole of the concave washer are all greater than the diameter of the middle column segment;

an upper step surface achieves the transition between the enlarged portion at the upper portion of the blind rivet and the middle column segment; a lower step surface achieves the transition between the enlarged portion at the lower portion of the blind rivet and the middle column segment; the upper step surface and the lower step surface are both circular conical surfaces or spherical cambered surfaces; the enlarged portion at the upper portion of the blind rivet is supported on the top wall of the upper cavity by means of an upper arcuate washer, and an upper surface of the upper arcuate washer is a circular conical surface or a spherical cambered surface fitted to the upper step surface; and the enlarged portion at the lower portion of the blind rivet is supported below the concave washer by means of a lower arcuate washer, and a lower surface of the lower arcuate washer is a circular conical surface or a spherical cambered surface fitted to the lower step surface.

The clamping device in this embodiment can conveniently release deformation of the clamped part in the machining process, and the quality of the machined part is good.

The present disclosure further provides a clamping device, comprising:
a base;
a clamping head comprising a blind rivet and a locking member, wherein the blind rivet comprises a middle column segment and enlarged portions respectively connected to upper and lower ends of the middle column segment, the locking member is configured to be connectable to an upper end of the blind rivet, and a clamping opening for clamping a part is defined between the locking member and the blind rivet;
a lower cavity connected to the base;
an upper cavity comprising an annular peripheral wall and a top wall formed extending inwards in a radial direction from an upper edge of the peripheral wall and having a central hole, wherein the top wall is clamped between the two enlarged portions of the blind rivet, the middle column segment of the blind rivet movably passes through the central hole, and the upper cavity is connected to the lower cavity in a fit manner;
an elastic member located in the peripheral wall, wherein a lower end of the elastic member is supported above the enlarged portion at the lower portion of the blind rivet, and an upper end of the elastic member elastically presses the top wall against the enlarged portion at the upper portion of the blind rivet; and
a support cylinder movably fitted in the lower cavity and capable of moving up and down relative to the lower cavity, wherein the support cylinder is supported below the elastic member.

In use of the clamping device of the present disclosure, the part is clamped at the clamping opening between the locking member and the blind rivet; during machining, if it is required to release deformation of the part, the locking member is loosened, and then the support cylinder is moved upwards to compress the elastic member supported thereon such that the blind rivet is in a relaxed state allowing deformation of the part; according to the deformation state of the part, the posture of the blind rivet is adjusted such that the upper surface of the blind rivet is in contact with the surface of the deformed part, the part is clamped again by using the locking member, and then the machining continues.

In subsequent machining, the deformation may be released as many times as desired until the machining of the part is completed.

In an implementation:
an upper step surface achieves the transition between the enlarged portion at the upper portion of the blind rivet and the middle column segment, a lower step surface achieves the transition between the enlarged portion at the lower portion of the blind rivet and the middle column segment, and the upper step surface and the lower step surface are both circular conical surfaces or spherical cambered surfaces;
the enlarged portion at the upper portion of the blind rivet is supported on the top wall of the upper cavity by means of an upper arcuate washer, and an upper surface of the upper arcuate washer is a circular conical surface or a spherical cambered surface fitted to the upper step surface; and
the enlarged portion at the lower portion of the blind rivet is supported at the lower end of the elastic member by means of a lower arcuate washer, and a lower surface of the lower arcuate washer is a circular conical surface or a spherical cambered surface fitted to the lower step surface.

In an implementation:
a concave washer is movably fitted in the peripheral wall of the upper cavity;
the lower end of the elastic member elastically presses the concave washer against the enlarged portion at the lower portion of the blind rivet; and
the support cylinder vertically supports the elastic member by means of the concave washer.

In an implementation:
the diameters of the central hole, an inner hole of the elastic member and an inner hole of the concave washer are all greater than the diameter of the middle column segment.

In an implementation:
a pressure sensor is provided at the upper portion of the enlarged portion at the upper portion of the blind rivet and used for measuring a force borne by a part clamped at the clamping opening.

In an implementation:
the lower cavity comprises an annular enclosure wall and a bottom wall connected to a lower end opening of the enclosure wall, such that the lower cavity is of a cylindrical structure opening upwards;
the support cylinder comprises a cylindrical portion opening downwards and an annular support wall located on the cylindrical portion, wherein the cylindrical portion is slidably fitted in the enclosure wall of the lower cavity and forms a fluid chamber with the lower cavity, and the support wall is located between the peripheral wall of the upper cavity and the enlarged portion at the lower portion of the blind rivet and is vertically supported at the lower end of the elastic member; and
a fluid pipeline is in communication with the fluid chamber and used for inputting a fluid into the fluid chamber or outputting a fluid from the fluid chamber.

In an implementation:
a cylindrical portion of the support cylinder is fitted to a lower section of an enclosure wall of the lower cavity, and an outer peripheral face of a support wall of the support cylinder and an upper section of the enclosure wall of the lower cavity are spaced to define an annular space;
the peripheral wall of the upper cavity is downwards slidably fitted in the annular space, and an inner peripheral face of the upper section of the enclosure wall of the lower cavity is provided with a recessed annular groove; a lower edge of the peripheral wall of the upper cavity has a convex ring that is formed expanding outwards in the radial direction; and the peripheral wall of the upper cavity is limited between two end faces of the annular groove in an axial direction by means of the convex ring thereof.

In an implementation:
the base comprises an annular outer wall, and the lower cavity is movably fitted on the inner peripheral face of the outer wall; and
an expansion sleeve is provided between the outer wall and the lower cavity, and the expansion sleeve is capable of expanding or contracting to limit or unlock the movement of the lower cavity relative to the base.

In an implementation:
the inner peripheral face of the outer wall is provided with a recessed circumferential groove, the expansion sleeve is embedded in the circumferential groove, an inner peripheral face of the expansion sleeve is coplanar with the inner peripheral face of the outer wall located at the upper portion of the circumferential groove, and sliding fit of inner and outer cylindrical surfaces is formed between the inner peripheral face of the expansion sleeve and an outer peripheral face of an enclosure wall of the lower cavity; and the inner peripheral face of the outer wall located at the lower portion of the circumferential groove is recessed relative to the inner peripheral face of the expansion sleeve, a lower end of the enclosure wall of the lower cavity extends outwards in the radial direction to form an annular convex edge, and an outer peripheral face of the convex edge is attached to the inner peripheral face of the outer wall at the lower portion of the circumferential groove such that the convex edge is limited below a lower end face of the expansion sleeve.

In an implementation:

the outer wall comprises a lower housing and an upper housing that are connected in a vertically superposed manner, and parting surfaces of the lower housing and the upper housing are located between an upper end face and a lower end face of the expansion sleeve.

In an implementation:

the base comprises a horizontal base plate and an outer wall perpendicularly connected to the base plate;

the bottom wall of the lower cavity is provided with a fluid through hole through in an axial direction; and the upper surface of the base plate corresponding to the fluid through hole is recessed to form a blind hole, and a tube hole that is in communication with the outer peripheral face of the base plate and the blind hole is further provided in the base plate and serves as a passage leading to the fluid chamber.

In an implementation:

the outer peripheral face of the cylindrical portion of the support cylinder is sleeved with an annular seal ring, and the periphery of the annular seal ring is sealingly in contact with the inner peripheral face between the lower sections of the peripheral wall of the lower cavity.

In an implementation:

two axial ends of the central hole are chamfered or rounded to increase the diameter of the central hole at the two ends thereof.

In an implementation:

an expansion chamber is enclosed between one side of the outer peripheral face of the expansion sleeve and the inner peripheral face of the outer wall, the outer wall of the base is provided with a communication port in communication with the expansion chamber to introduce or discharge a fluid into or out of the expansion chamber so as to expand or contract the expansion sleeve.

In an implementation:

the expansion sleeve is made of an elastic material, the expansion sleeve is of an annular structure, the axial middle portion of an outer surface thereof is recessed to form an annular groove, and the expansion chamber is defined between the annular groove and the inner peripheral face of the lower cavity.

The present disclosure also provides a machining method based on any one of the preceding clamping devices, the machining method comprising:

clamping a part at a clamping opening between a locking member and a blind rivet; and performing one or more clamping adjustment operations adapted to part machining deformation during machining, wherein the implementation of the clamping adjustment operations is: loosening the locking member and then moving a support cylinder upwards to compress an elastic member supported thereon such that the blind rivet is in a relaxed state allowing deformation of the part; and according to the deformation state of the part, adjusting the posture of the blind rivet such that the upper surface of the blind rivet is in contact with the surface of the deformed part, and then clamping the part again by using the locking member.

The machining deformation of the part can be conveniently released during the machining of the aforementioned clamping device, so that the machined part has high precision.

BRIEF DESCRIPTION OF THE DRAWINGS

In order to illustrate the technical solutions of the embodiments of the present invention more clearly, a brief introduction to the drawings mentioned in the embodiments will be provided below, and it should be understood that the following drawings merely illustrate some embodiments of the present invention, and therefore should not be construed as limiting the scope. Those of ordinary skill in the art may also obtain other relevant drawings according to these drawings without involving any inventive effort.

REFERENCE SIGNS

Figure 1:
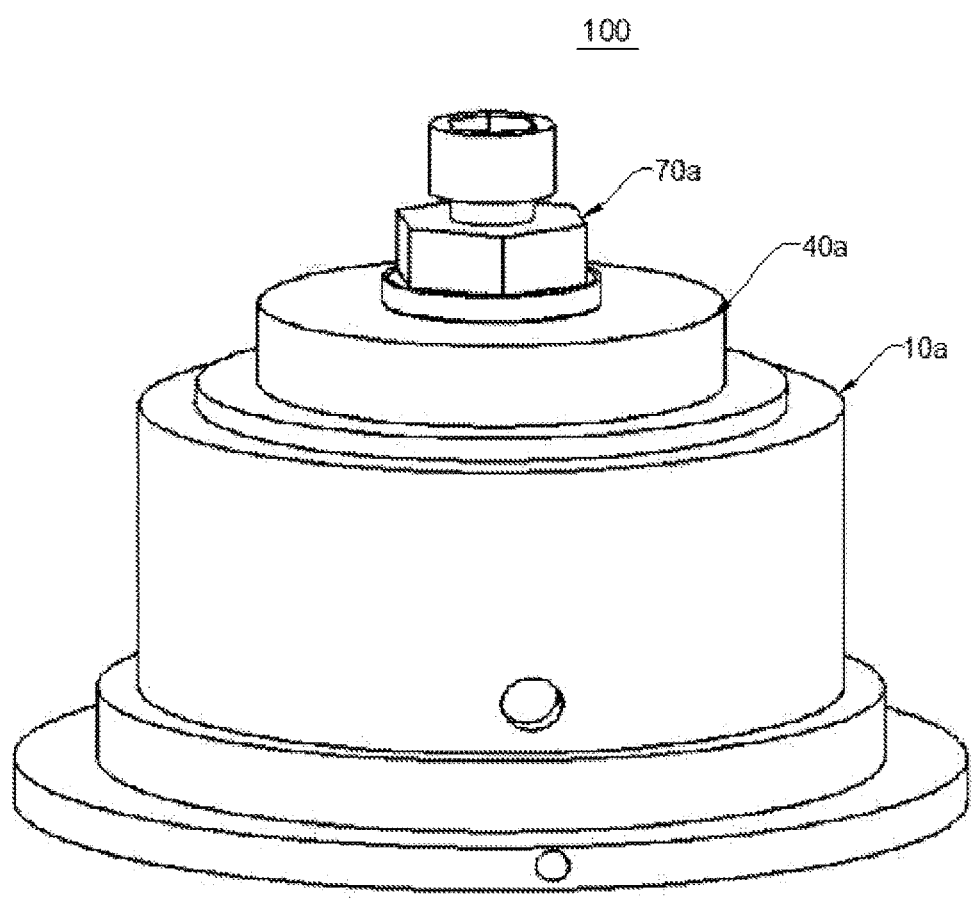
FIG. 1 shows a three-dimensional view of a clamping device of the present disclosure.

100—Clamping device; 10a—Peripheral portion; 10—Base; 11—Base plate; 12—Blind hole; 13—Tube hole; 14—Annular portion; 15—Open hole; 16—Annular wall; 17—Outer wall; 18—Circumferential groove; 19—Communication port; 20—Lower housing; 21—Upper housing; 22—Parting surface; 23—Expansion sleeve; 24—Expansion chamber; 25—Annular groove; 26—Sealing ring; 27—Fluid pipeline; 40a—Middle portion; 40—Adjustable assembly; 41—Lower cavity; 42—Upper cavity; 43—Support cylinder; 44—Enclosure wall; 45—Bottom wall; 46—Support member; 47—Lower fluid chamber; 48—Cylindrical portion; 49—Support wall; 50—Fluid chamber; 51—Annular space; 52—Annular seal ring; 53—Fluid through hole; 54—Peripheral wall; 55—Central hole; 56—Top wall; 57—Annular groove; 58—Convex ring; 60—Convex edge; 70a—Inner portion; 70—Clamping head; 71—Blind rivet; 72—Locking member; 73—Screw; 74—Middle column segment; 75—Enlarged portion; 76—Clamping opening; 77—Threaded hole; 78—Screw head; 80—Concave washer; 83—Elastic member; 84—Laminated spring; 85—Upper step surface; 86—Lower step surface; 87—Upper arcuate washer; 88—Lower arcuate washer; 89—Rounded portion; 90—Pressure sensor; 91—Friction pad; 300—Part; 301—Configuration hole; 500—Machining platform.

DETAILED DESCRIPTION OF EMBODIMENTS

In order to make the objectives, technical solutions and advantages of embodiments of the present invention clearer, the technical solutions in the embodiments of the present invention will be clearly and completely described below with reference to the accompanying drawings in the embodiments of the present invention. Obviously, the described embodiments are some of, rather than all of, the embodiments of the present invention. Generally, the assemblies of the embodiments of the present invention described and illustrated in the drawings herein may be arranged and designed in a variety of different configurations.

Thus, the following detailed description of the embodiments of the present invention provided in the drawings is not intended to limit the scope of the present invention as claimed, but is merely representative of the selected embodiments of the present invention. Based on the embodiments of the present invention, all other embodiments obtained by those of ordinary skill in the art without involving any inventive effort shall fall within the scope of protection of the present invention.

It should be noted that the similar numerals and letters denote similar items in the following accompanying drawings, and therefore, once an item is defined in one accompanying drawing, it need not be further defined and explained in the subsequent accompanying drawings.

In the description of the present invention, it should be noted that the orientation or position relationship indicated by the terms, such as "centre", "upper", "lower", "left", "right", "vertical", "horizontal", "inside" and "outside", is based on the orientation or position relationship shown in the figures, or is the orientation or position relationship of usual placement of the present invention when in use, which is only for convenience of the description of the present invention and the simplified description, rather than indicating or implying that the devices or elements specified necessarily have a specific orientation or are constructed and operated in a specific orientation, and therefore cannot be construed as limiting the present invention. Furthermore, the terms such as "first" and "second" in the description of the present invention are used for descriptive purposes only and are not to be construed as indicating or implying relative importance.

In addition, the terms such as "horizontal" and "vertical" in the description of the present invention do not mean that a component is required to be absolutely horizontal or suspended, but may be slightly inclined. For example, "horizontal" only means that the direction is more horizontal than "vertical", and does not mean that the structure must be completely horizontal, and the structure can be slightly inclined.

In the description of the present invention, it should also be noted that the terms "setup", "installation", "connected", and "connection" should be understood in a generalized sense, unless otherwise explicitly specified and limited. For example, the connection can be a fixed connection, and can also be a detachable connection or an integrated connection; can be a mechanical connection, and can also be an electrical connection; and can be a direct connection, can also be an indirect connection through an intermediate medium, and can be communication between interiors of two elements. For those of ordinary skill in the art, the specific meaning of the terms mentioned above in the present invention may be construed according to specific circumstances.

Embodiment I

Figure 2:
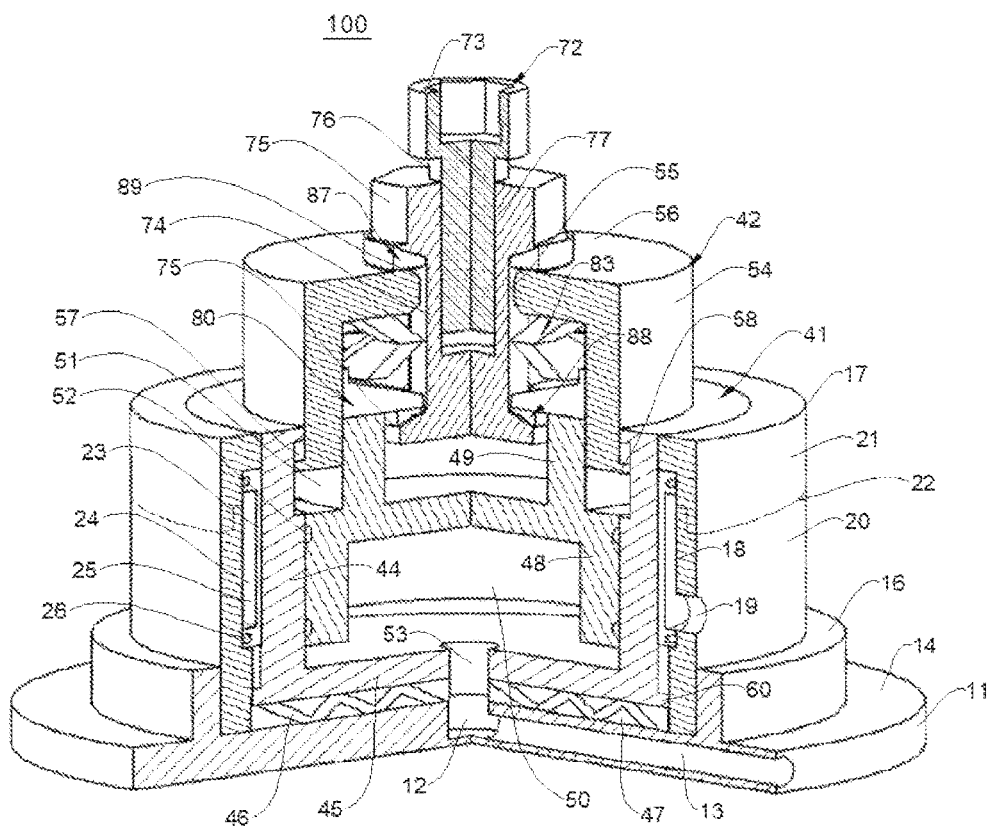
FIG. 2 is a sectional view of FIG. 1.

Referring to FIGS. 1 and 2, this embodiment provides a clamping device 100, comprising a base 10, an adjustable assembly 40, and a clamping head 70, wherein the clamping head 70 is mounted on the base 10 by means of the adjustable assembly 40.

Figure 3:
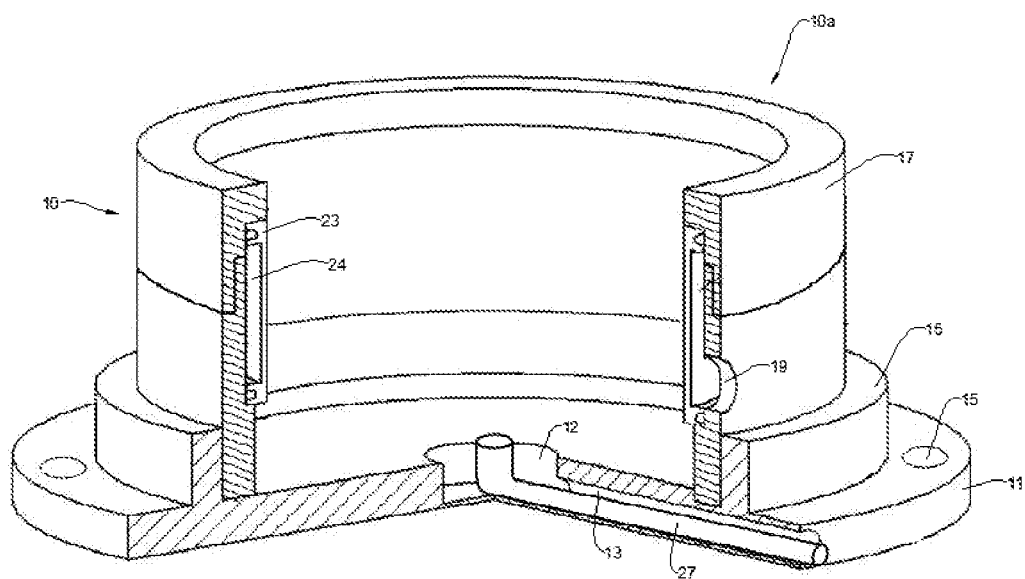
FIG. 3 shows a peripheral portion assembly of FIG. 2.

FIG. 3 is a schematic structural diagram of a peripheral portion 10a in this embodiment, mainly showing members associated with the base 10.

Referring to FIG. 3 in conjunction with FIG. 2, in this embodiment, the base 10 comprises a base plate 11 and an annular outer wall 17 perpendicularly connected to the base plate 11. An expansion sleeve 23 is embedded in an inner peripheral face of the outer wall 17. The base plate 11 may be provided as a circular plate and the outer wall 17 is an annular wall. The outer diameter of the outer wall 17 is smaller than that of the base plate 11 such that the base plate 11 has an annular portion 14 exposed out of the outer wall 17. Circumferential open holes 15 are formed in the annular portion 14 to facilitate fixation of the base 10 to a part 300 machining platform 500 by means of connecting screws 73, if desired. The base plate 11 and the outer wall 17 may be provided integrally, or may be separately provided and integrally connected by other structures. The upper surface of the illustrated base plate 11 is provided with an upwards protruding annular wall 16, the outer wall 17 is fitted to an inner peripheral face of the annular wall 16 by means of an outer peripheral face thereof, and the two walls may be connected in an interference fit manner, or may be threadedly connected by means of connecting screws, etc. The outer wall 17 shown in FIG. 3 comprises a lower housing 20 and an upper housing 21 connected in a vertically superposed manner, and parting surfaces 22 of the lower housing 20 and the upper housing 21 are located between an upper end face and a lower end face of the expansion sleeve 23. Mounting of the expansion sleeve 23 is facilitated by configuring the outer wall 17 to be detachably connected up and down.

In this embodiment, an expansion chamber 24 is enclosed between one side of the outer peripheral face of the expansion sleeve 23 and the inner peripheral face of the outer wall 17, and the outer wall 17 of the base 10 is provided with a communication port 19 in communication with the expansion chamber 24, which communication port is used for introducing or discharging a fluid, such as a gas or a liquid, into or out of the expansion chamber 24 so as to expand or contract the inward expansion sleeve 23. The inward expansion or contraction of the expansion sleeve 23 makes it possible to hold a member (described in more detail below) fitted to the inner peripheral face thereof. Optionally, the expansion sleeve 23 is made of an elastic material, the expansion sleeve 23 is of an annular structure, an axial middle portion 40a of an outer surface thereof is recessed to form an annular groove 25, and the expansion chamber 24 is defined between the annular groove 25 and the inner peripheral face of the lower cavity 41. In order to improve the sealability of the expansion chamber 24, sealing rings 26 are respectively provided between the outer peripheral surfaces of portions of the expansion sleeve 23 at two vertical ends of the expansion chamber 24 thereof and the annular groove 25.

Figure 4:
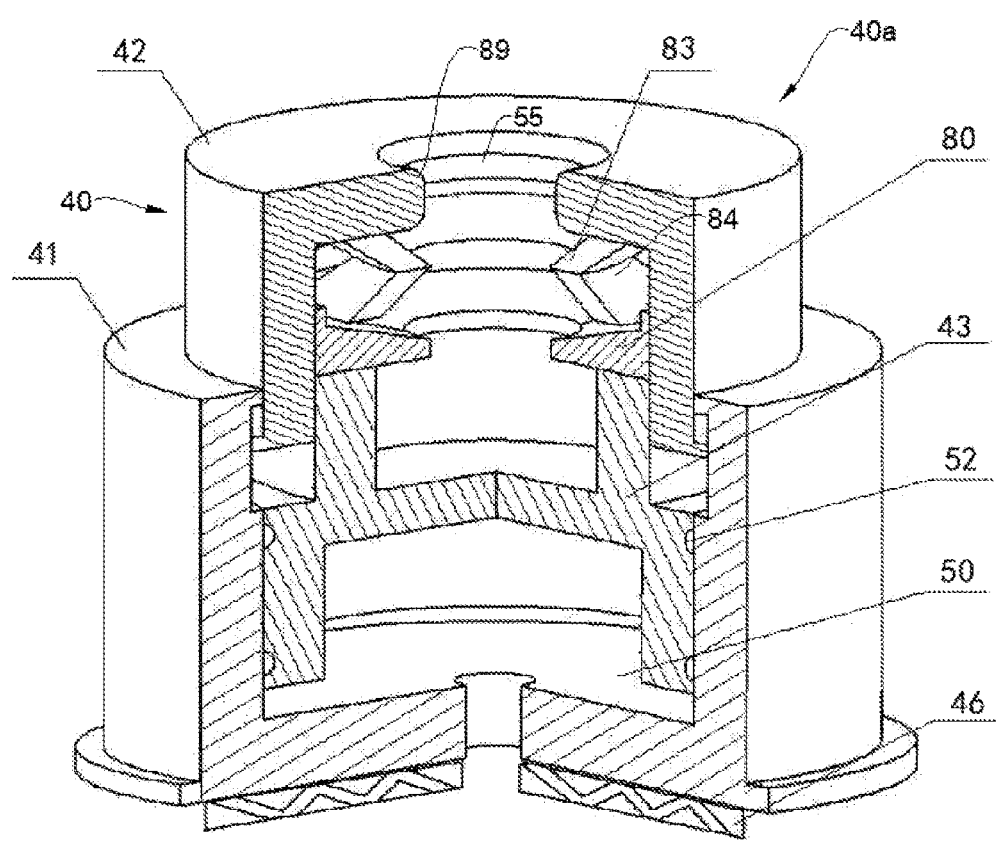
FIG. 4 shows a middle portion assembly of FIG. 2.

FIG. 4 is a schematic structural diagram of a middle portion 40a in this embodiment, mainly showing members associated with the adjustable assembly 40.

Referring to FIG. 4 in conjunction with FIG. 2, in this embodiment, the adjustable assembly 40 comprises a lower cavity 41, an upper cavity 42, and a support cylinder 43. The lower cavity 41 comprises an annular enclosure wall 44 and a bottom wall 45 connected to a lower end opening of the enclosure wall 44, the enclosure wall 44 is slidably fitted in the outer wall 17 of the base 10 and can be expanded and pressed against the outer wall 17 by the expansion sleeve 23, the bottom wall 45 is supported on the base plate 11 in a spaced manner by means of a support member 46, and a lower fluid chamber 47 is defined therebetween. The support member 46 in this embodiment does not fill the lower fluid chamber 47 such that the fluid can enter the lower fluid chamber 47. The support member 46 in this embodiment may be a spring for surface supporting, such as a corrugated spring. Of course, it may be an elastic support member 46 made of a non-metal such as rubber.

The support cylinder 43 comprises a cylindrical portion 48 opening downwards and an annular support wall 49 located on the cylindrical portion 48, wherein the cylindrical portion 48 is slidably fitted in the enclosure wall 44 of the lower cavity 41 and forms a fluid chamber 50 with the lower cavity 41 in an enclosed manner, the cylindrical portion 48 of the support cylinder 43 is fitted to a lower section of the enclosure wall 44 of the lower cavity 41, and the outer peripheral face of the support wall 49 of the support cylinder 43 and an upper section of the enclosure wall 44 of the lower cavity 41 are spaced to define an annular space 51. The outer peripheral face of the cylindrical portion 48 of the support cylinder 43 is sleeved with an annular seal ring 52, and the periphery of the annular seal ring 52 is sealingly in contact with the inner peripheral face between the lower sections of the enclosure wall 44 of the lower cavity 41 to achieve sealing fit of the contact surfaces therebetween and to ensure the sealability of the fluid chamber 50.

Referring to FIG. 3 in conjunction, the bottom wall 45 is provided with fluid through holes 53 passing through upper and lower surfaces thereof, an upper surface of the base plate 11 has a blind hole 12 formed by recessing, and the blind hole 12 and the fluid through holes 53 are respectively in communication with the lower fluid chamber 47; a tube hole 13 that is in communication with an outer peripheral face of the base plate 11 and the blind hole 12 is further provided in the base plate 11, and serves as a passage leading to the fluid chamber 50 so as to adjust a vertical position of the support cylinder 43 by introducing/discharging a fluid (such as a gas or a liquid), namely, when there is more fluid introduced into the fluid chamber 50, the support cylinder 43 is pushed up to a higher position; conversely, the support cylinder 43 will be in a lower position. FIG. 3 additionally shows a fluid pipeline 27 for flow passing, the fluid pressure borne by upper and lower portions of the bottom wall 45 of the lower cavity 41 is counteracted due to the presence of the lower fluid chamber 47, so that the fluid pressure does not cause vertical movement of the lower cavity 41.

Referring to FIG. 2 or FIG. 4, the upper cavity 42 comprises an annular peripheral wall 54 and a top wall 56 formed extending inwards in a radial direction from an upper edge of the peripheral wall 54 and having a central hole 55, wherein the peripheral wall 54 of the upper cavity 42 is downwards slidably fitted in the annular space 51, an inner peripheral face of the upper section of the enclosure wall 44 of the lower cavity 41 is provided with a recessed annular groove 57, a lower edge of the peripheral wall 54 of the upper cavity 42 has a convex ring 58 that is formed expanding outwards in the radial direction, and the peripheral wall 54 of the upper cavity 42 is limited between two end faces of the annular groove 57 in an axial direction by means of the convex ring 58 thereof.

In this embodiment, optionally, the inner peripheral face of the outer wall 17 is provided with a recessed circumferential groove 18, the expansion sleeve 23 is embedded in the circumferential groove 18, the inner peripheral face of the expansion sleeve 23 is coplanar with the inner peripheral face of the outer wall 17 located at the upper portion of the circumferential groove 18, and sliding fit of inner and outer cylindrical surfaces is formed between the inner peripheral face of the expansion sleeve and the outer peripheral face of the enclosure wall 44 of the lower cavity 41; the inner peripheral face of the outer wall 17 at the lower portion of the circumferential groove 18 is recessed relative to the inner peripheral face of the expansion sleeve 23, the lower end of the enclosure wall 44 of the lower cavity 41 extends outwards in the radial direction to form an annular convex edge 60, and the outer peripheral face of the convex edge 60 is attached to the inner peripheral face of the outer wall 17 at the lower portion of the circumferential groove 18 such that the convex edge 60 is confined below the lower end face of the expansion sleeve 23. This arrangement allows the lower cavity 41 to be vertically adjustable relative to the base 10 so as to meet different supporting height requirements.

Figure 5:
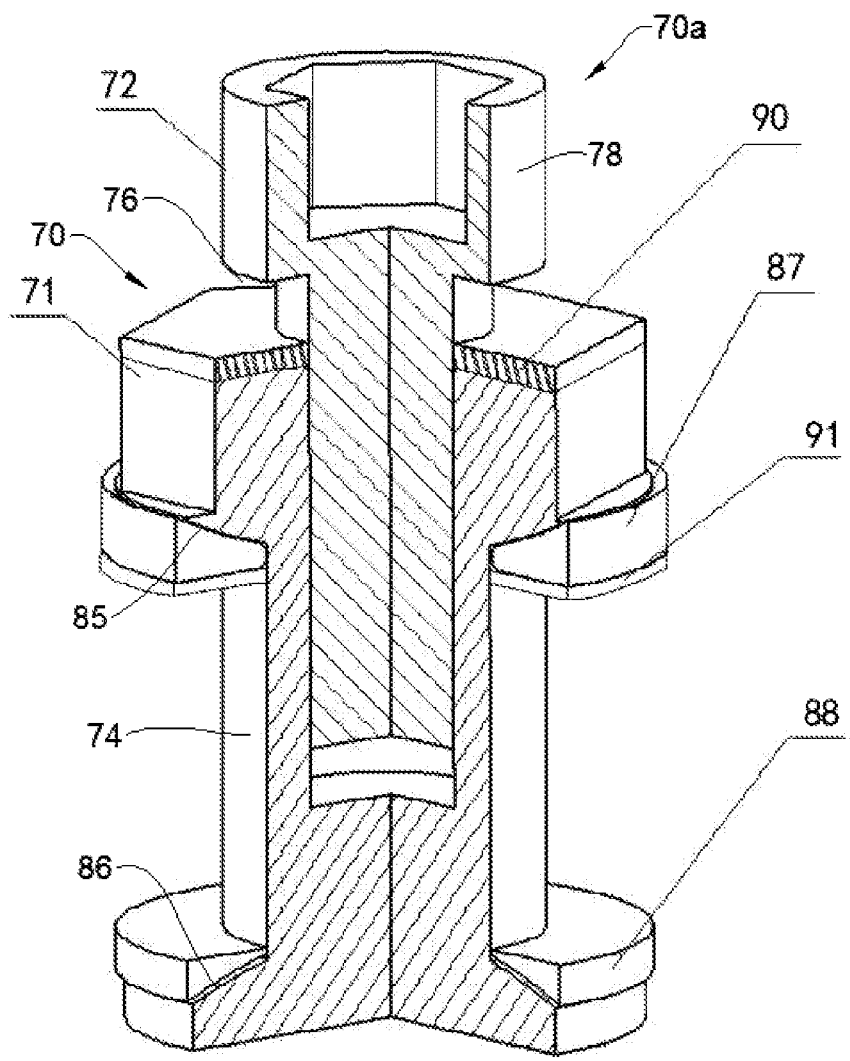
FIG. 5 shows an inner portion assembly of FIG. 2.

FIG. 5 is a schematic structural diagram of an inner portion 70a in this embodiment, mainly showing members associated with the clamping head 70.

Referring to FIG. 2 or FIG. 5 in conjunction, the clamping head 70 in this embodiment comprises a blind rivet 71 and a locking member 72, wherein the blind rivet 71 comprises a middle column segment 74 and enlarged portions 75 respectively connected to upper and lower ends of the middle column segment 74, the middle column segment 74 may be configured to be a cylinder, and the enlarged portions 75 at the two ends may be configured to be in the shape of a regular polygon, a cylinder or others coaxial with the middle column segment 74; and the locking member 72 is configured to be connectable to an upper end of the blind rivet 71, and a clamping opening 76 for clamping the part 300 is defined between the locking member 72 and the blind rivet 71. The locking member 72 shown in the figure is a screw 73, and correspondingly, the blind rivet 71 is provided with a threaded hole 77 downwards formed from the top face thereof, and the screw 73 serving as the locking member 72 is threadedly connected in the threaded hole 77 of the blind rivet 71. Optionally, the depth of the threaded hole 77 is greater than the length of a threaded section of the screw 73 such that the size of the clamping opening 76 is adjustable to adapt to parts 300 of different thicknesses. A clamping opening 76 is defined between the lower end face of a screw 73 head of the screw 73 and the top face of the blind rivet 71. That is, the part 300 to be clamped may be clamped in the clamping opening 76. For example, for a thin plate-like part 300 to be machined, a configuration hole 301 may be formed in the part 300. When it is required to clamp the part 300, the part 300 is superposed on the top face of the blind rivet 71, and the configuration hole 301 corresponds to the threaded hole 77 in the blind rivet 71; and the screw 73 is then threaded through the configured hole 301 of the part 300 and threadedly connected into the threaded hole 77 of the blind rivet 71 until the lower end face of the screw 73 head of the screw 73 presses the part 300 against the top face of the blind rivet 71.

Of course, in other implementations, the locking member 72 may also be a specially-made connector other than a standard screw 73 structure. For example, the locking member 72 and the blind rivet 71 may also be connected by profile fit.

The top wall 56 is clamped between the two enlarged portions 75 of the blind rivet 71, and the middle column segment 74 of the blind rivet 71 movably passes through the central hole 55; a concave washer 80 is provided between the inner peripheral face of the peripheral wall 54 and the outer peripheral face of the middle column segment 74; a laminated spring 84 as an elastic member 83 is provided in the peripheral wall 54 and is elastically supported between the top wall 56 and the concave washer 80 to elastically strut the concave washer 80 and the peripheral wall 54 between the enlarged portion 75 at the lower portion of the blind rivet 71 and the enlarged portion 75 at the upper portion of the blind rivet 71. The support wall 49 of the support cylinder 43 is located between the peripheral wall 54 of the upper cavity 42 and the enlarged portion 75 at the lower portion of the blind rivet 71 and is vertically supported at the lower end of the elastic member 83. The concave washer 80 in this embodiment is wedge-shaped, and the lower end face thereof is planar to be fitted to the support cylinder 43 supported therebelow, and the upper end face thereof is a circular conical surface to be fitted to the elastic member 83 as the laminated spring 84 supported thereon.

In this embodiment, the diameters of the central hole 55, an inner hole of the elastic member 83 and an inner hole of the concave washer 80 are all greater than that of the middle column segment 74, an upper step surface 85 achieves the transition between the enlarged portion 75 at the upper portion of the blind rivet 71 and the middle column segment 74, a lower step surface 86 achieves the transition between the enlarged portion 75 at the lower portion of the blind rivet 71 and the middle column segment 74, and the upper step surface 85 and the lower step surface 86 are both circular conical surfaces or spherical cambered surfaces; the enlarged portion 75 at the upper portion of the blind rivet 71 is supported on the top wall 56 of the upper cavity 42 by means of an upper arcuate washer 87, the upper surface of the upper arcuate washer 87 is a circular conical surface or a spherical cambered surface fitted to the upper step surface 85, and the lower surface of the upper arcuate washer 87 and the upper surface of the top wall 56 may be maintained in planar contact fit; and the enlarged portion 75 at the lower portion of the blind rivet 71 is supported below the concave washer 80 by means of a lower arcuate washer 88, a lower surface of the lower arcuate washer 88 is a circular conical surface or a spherical cambered surface fitted to the lower step surface 86, and the upper surface of the lower arcuate washer 88 and the upper surface of the concave washer 80 may be maintained in planar contact fit. The upper step surface 85 and the lower step surface 86 may be provided as convex surfaces, and the lower surface of the corresponding upper arcuate washer 87 and the upper surface of the lower arcuate washer 88 are concave surfaces. The clearance fit of the larger-diameter hole and the smaller-diameter middle column segment 74 and the circular conical surface/spherical cambered surface fit between the enlarged portion 75 of the blind rivet 71 and the upper arcuate washer 87/lower arcuate washer 88 allow the blind rivet 71 to have three-dimensional floating capability, that is to say, the blind rivet 71 cannot only translate vertically, but also laterally offset or deflect at an angle back and forth/left and right, such that it has higher adaptability to machining deformation of the part 300. Optionally, two axial ends of the central hole 55 may also be chamfered or rounded 89 to increase the diameter of the central hole 55 at the two ends thereof and to further extend the adjustable range of the blind rivet 71. In this embodiment, in order to increase the frictional force between the lower arcuate washer 88 and the top wall 56 of the upper cavity 42, a friction pad 91 is provided below the lower arcuate washer 88. The friction pad 91 may be made of rubber or other materials.

Figure 6:
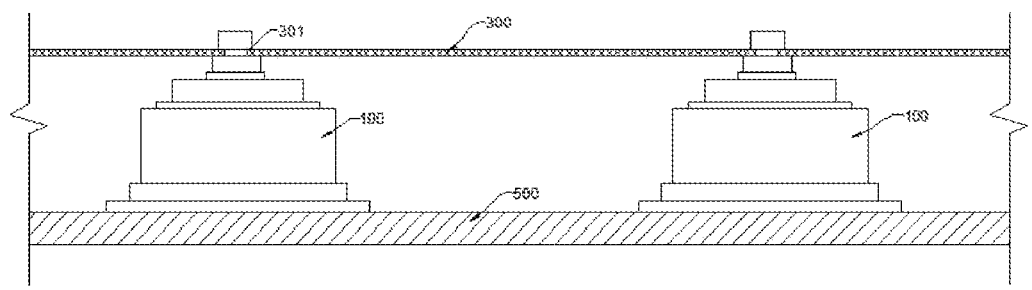
FIG. 6 shows a schematic diagram of the clamping device in an embodiment when a part is clamped.

Referring to FIG. 6 in conjunction, a use method for the clamping device 100 in this embodiment may comprise:

fixing the clamping device 100 to a machining platform 500 of the part 300 by means of the base 10;

clamping the part 300 to be machined at the clamping opening 76 between the locking member 72 and the blind rivet 71 for machining, and for a large thin plate-like part 300, using the clamping device 100 in this embodiment to respectively clamp a plurality of points of the part 300;

during machining, when it is required to release the deformation of the part 300, loosening the locking member 72, and introducing a high-pressure fluid into the fluid chamber 50 to drive the support cylinder 43 to move upwards so as to compress the elastic member 83 supported thereon such that the blind rivet 71 is in a relaxed state allowing deformation of the part 300, adjusting the posture of the blind rivet 71 according to the deformation state of the part 300 such that the upper surface of the blind rivet 71 is in contact with the surface of the deformed part 300, and after the part 300 is clamped again with the locking member 72, namely, the machining deformation of the part 300 is released, continuing to perform subsequent machining; and in subsequent machining, the deformation may be released as many times as desired until the machining of the part 300 is completed.

This embodiment gives a more detailed configuration, and the effects of the present invention may also be achieved without part of structures in the configuration. More simplified implementations will be described below. Of course, although these embodiments are simplified, these embodiments are also capable of achieving the technical effect of releasing the machining deformation of the part 300, and may have the advantage of lower structural/machining costs, or other advantages. A user may select them according to the actual situations.

Embodiment II

Referring to FIGS. 1 to 6, this embodiment provides a clamping device 100, comprising a base 10, a clamping head 70, a lower cavity 41, an upper cavity 42, an elastic member 83, and a support cylinder 43.

The clamping head 70 comprises a blind rivet 71 and a locking member 72, wherein the blind rivet 71 comprises a middle column segment 74 and enlarged portions 75 respectively connected to upper and lower ends of the middle column segment 74, the locking member 72 is configured to be connectable to an upper end of the blind rivet 71, and a clamping opening 76 for clamping a part 300 is defined between the locking member 72 and the blind rivet 71. The clamping opening 76 defined between the locking member 72 and the blind rivet 71 may be selected according to the shape of the part 300 to be clamped. In this embodiment, optionally, the upper portion of the enlarged portion 75 at the upper portion of the blind rivet 71 is provided with a pressure sensor 90 for measuring the force borne by the part 300 clamped at the clamping opening 76. The pressure sensor 90 may be detachably connected to the blind rivet 71, or may be directly and integrally provided on the blind rivet 71. Of course, in other implementations, the pressure sensor 90 may also be provided at other suitable positions, for example, on the locking member 72. The pressure sensor 90 may be a sheet-like structure having a central hole that allows the locking member 72 to pass through. The pressure sensor 90 may be provided as a wireless pressure sensor 90, and the data acquired by the pressure sensor may be wirelessly transmitted to a user or a control system as a basis for operation or control of the user or the control system.

The lower cavity 41 is connected to the base 10. The two may be connected in the mode of connection vertically adjustable relative to the base 10 in Embodiment I, or may also be provided to be fixed to each other.

The upper cavity 42 comprises an annular peripheral wall 54 and a top wall 56 formed extending inwards in a radial direction from an upper edge of the peripheral wall 54 and having a central hole 55, wherein the top wall 56 is clamped between the two enlarged portions 75 of the blind rivet 71, and the middle column segment 74 of the blind rivet 71 movably passes through the central hole 55; the upper cavity 42 is connected to the lower cavity 41 in a fit manner; and the upper cavity 42 may be fixedly connected to the upper cavity 42 or may also have a certain vertical movement space.

The elastic member 83 is located in the peripheral wall 54, the lower end of the elastic member 83 is supported above the enlarged portion 75 at the lower portion of the blind rivet 71, and the upper end of the elastic member elastically presses the top wall 56 against the enlarged portion 75 at the upper portion of the blind rivet 71. The elastic member 83 may be a laminated spring 84 as described in Embodiment I, or may be an elastic rubber, etc.

The support cylinder 43 is movably fitted in the lower cavity 41 and can move up and down relative to the lower cavity 41, and the support cylinder 43 is supported below the elastic member 83. The support cylinder 43 may be provided to be movable up and down relative to the lower cavity 41 in such a manner that a fluid is introduced/discharged as described in Embodiment I, or in other forms, for example, being driven by a driving device capable of achieving linear driving, such as a linear motor. At this time, the driving device may be fixedly connected to the lower cavity 41, and is connected to the support cylinder 43 by means of a telescopic end thereof so as to drive vertical movement of the support cylinder 43 by means of telescoping of the telescopic end thereof.

In use of the clamping device 100 in the present disclosure, the part 300 is clamped at the clamping opening 76 between the screw 73 and the blind rivet 71; during machining, when it is required to release the deformation of the part 300 (for example, when the clamping force borne by the part 300 detected by the pressure sensor 90 exceeds a set threshold range), the screw 73 is loosened, and then the support cylinder 43 is moved upwards to compress the elastic member 83 supported thereon such that the blind rivet 71 is in a relaxed state allowing deformation of the part 300; according to the deformation state of the part 300, the posture of the blind rivet 71 is adjusted such that the upper surface of the blind rivet 71 is in contact with the surface of the deformed part 300, and after the part 300 is clamped again with the screw 73, the machining can be continued.

In subsequent machining, the clamping force may be varied as needed to release the deformation multiple times until the machining of the part 300 is completed.

With regard to the blind rivet 71 in this embodiment, in addition to the use of the disclosed circular conical surface or spherical cambered surface fit between the enlarged portion 75 and the upper arcuate washer 87/lower arcuate washer 88 in Embodiment I, when the deflection capability of the blind rivet 71 is not required, the upper arcuate washer 87/lower arcuate washer 88 may be omitted, and the upper step surface 85 and the lower step surface 86 of the enlarged portion 75 may be provided as planes to form planar contact fit.

In addition, in the case where the deflection ability of the blind rivet 71 is not required, the diameters of the central hole 55, the inner hole of the elastic member 83, etc. may be set to be equal to the diameter of the middle column segment 74. In this way, the blind rivet 71 may only achieve adjustment of a vertical position.

The lower end of the elastic member 83 in this embodiment may be directly elastically supported to the enlarged portion 75 of the blind rivet 71, and the support cylinder 43 is directly supported to the bottom of the elastic member 83 without arranging the concave washer 80 as described in Embodiment I.

The support cylinder 43 in this embodiment may also be provided in other structural forms. For example, with regard to the support cylinder 43 driven by the linear motor described above, it is not required to provide the cylindrical portion 48, it is not required to enclose the fluid chamber 50 with a lower cylinder body, and it is only required to provide a connecting structure for connection at the telescopic end of the linear motor. The support wall 49 at the upper portion of the support cylinder 43 may also be configured to be a structure in which only the elastic member 83 is supported, and other structures may be omitted.

In this embodiment, the base 10 may be configured to have only a structure for mounting to a worktable, and even, in the case where relative movement of the lower cylinder body and the base 10 is not required, the base 10 and the lower cylinder body may be integrally provided as a whole structure.

For the above-mentioned case where it is not required to drive the support cylinder 43 to move by using the fluid, the structures for fluid passing of the base 10/lower chamber in Embodiment I, such as the fluid through holes 53, the blind hole 12, the tube hole 13 and the annular seal ring 52, may be omitted.

Embodiment III

The present disclosure also provides a machining method based on the clamping device 100 disclosed in Embodiment I or Embodiment II, the method comprising:

clamping a part 300 at a clamping opening 76 between a locking member 72 and a blind rivet 71;

performing one or more clamping adjustment operations adapted to machining deformation of the part 300 during machining, wherein the implementation of the clamping adjustment operations is: loosening the locking member 72 and then moving the support cylinder 43 upwards to compress the elastic member 83 supported thereon such that the blind rivet 71 is in a relaxed state allowing deformation of the part 300; and according to the deformation state of the part 300, adjusting the posture of the blind rivet 71 such that the upper surface of the blind rivet 71 is in contact with the surface of the deformed part 300, and then clamping the part 300 again by using the locking member 72.

The machining deformation of the part 300 may be conveniently released during the machining of the above-mentioned clamping device 100, so that the machined part 300 has high precision.

It can be seen from the above-mentioned embodiments that the clamping device 100 and the machining method have at least one of the following beneficial effects:

the machining deformation of the part 300 may be released during the machining, and the deformation may be gradually eliminated to ensure the final machining quality of the part 300;

the clamping head 70 may be conveniently adjusted in posture and may well clamp the deformed part 300; and during machining, the change in clamping force can be monitored in real time to provide data support for determining the deformation of the part 300.

INDUSTRIAL APPLICABILITY

It can be seen from the above-mentioned embodiments provided that the clamping device and the machining method of the present disclosure can conveniently release machining deformation of a part during machining, and can improve the quality of the machined part, and are industrially applicable.

The invention claimed is:

1. A clamping device comprising:
a base, an adjustable assembly, and a clamping head mounted to the base by means of the adjustable assembly,
wherein the base comprises a base plate and an annular outer wall perpendicularly connected to the base plate, and an expansion sleeve is embedded into an inner peripheral face of the outer wall;
the adjustable assembly comprises a lower cavity, an upper cavity and a support cylinder;
the lower cavity comprises an annular enclosure wall and a bottom wall connected to a lower end opening of the enclosure wall, the enclosure wall is slidably fitted in the outer wall of the base and is expandable and pressable against the outer wall by the expansion sleeve, the bottom wall is supported on the base plate in a spaced manner by means of a support member, and a lower fluid chamber is defined therebetween;
the support cylinder comprises a cylindrical portion opening downwards and an annular support wall located on the cylindrical portion; the cylindrical portion is slidably fitted in the enclosure wall of the lower cavity and forms a fluid chamber with the lower cavity in an enclosed manner, the cylindrical portion of the support cylinder is fitted to a lower section of the enclosure wall of the lower cavity, and an outer peripheral face of the support wall of the support cylinder and an upper section of the enclosure wall of the lower cavity are spaced to define an annular space;
the bottom wall is provided with fluid through holes passing through upper and lower surfaces thereof, an upper surface of the base plate has a blind hole formed by recessing, and the blind hole and the fluid through holes are respectively in communication with the lower fluid chamber; a tube hole that is in communication with an outer peripheral face of the base plate and the blind hole is further provided in the base plate, and serves as a passage leading to the fluid chamber so as to adjust a vertical position of the support cylinder by introducing/discharging a fluid;
the upper cavity comprises an annular peripheral wall and a top wall formed extending inwards in a radial direction from an upper edge of the peripheral wall and having a central hole; the peripheral wall of the upper cavity is downwards slidably fitted in the annular space, an inner peripheral face of the upper section of the enclosure wall of the lower cavity is provided with a recessed annular groove, a lower edge of the peripheral wall of the upper cavity has a convex ring that is formed expanding outwards in the radial direction, and the peripheral wall of the upper cavity is limited between two end faces of the annular groove in an axial direction by means of the convex ring thereof;

the clamping head comprises a blind rivet and a locking member; the blind rivet comprises a middle column segment and enlarged portions respectively connected to upper and lower ends of the middle column segment; the locking member is configured to be connectable to an upper end of the blind rivet, and a clamping opening for clamping a part is defined between the locking member and the blind rivet;
the top wall is clamped between the two enlarged portions of the blind rivet, and the middle column segment of the blind rivet movably passes through the central hole; a concave washer is provided between an inner peripheral face of the peripheral wall and an outer peripheral face of the middle column segment, and a laminated spring as an elastic member is provided in the peripheral wall and is elastically supported between the top wall and the concave washer to elastically strut the concave washer and the peripheral wall between the enlarged portion at the lower portion of the blind rivet and the enlarged portion at the upper portion of the blind rivet;
the support wall of the support cylinder is located between the peripheral wall of the upper cavity and the enlarged portion at the lower portion of the blind rivet, and is vertically supported at the lower end of the elastic member;
the diameters of the central hole, an inner hole of the elastic member and an inner hole of the concave washer are all greater than that of the middle column segment;
an upper step surface achieves the transition between the enlarged portion at the upper portion of the blind rivet and the middle column segment, a lower step surface achieves the transition between the enlarged portion at the lower portion of the blind rivet and the middle column segment, and the upper step surface and the lower step surface are both circular conical surfaces or spherical cambered surfaces; the enlarged portion at the upper portion of the blind rivet is supported on the top wall of the upper cavity by means of an upper arcuate washer, and an upper surface of the upper arcuate washer is a circular conical surface or a spherical cambered surface fitted to the upper step surface; and the enlarged portion at the lower portion of the blind rivet is supported below the concave washer by means of a lower arcuate washer, and a lower surface of the lower arcuate washer is a circular conical surface or a spherical cambered surface fitted to the lower step surface.

2. The clamping device of claim 1, characterized in that the concave washer is movably fitted in the peripheral wall of the upper cavity;
the lower end of the elastic member elastically presses the concave washer against the enlarged portion at the lower portion of the blind rivet; and
the support cylinder vertically supports the elastic member by means of the concave washer.

3. The clamping device of claim 2, characterized in that a pressure sensor is provided at the upper portion of the enlarged portion at the upper portion of the blind rivet and used for measuring a force borne by a part clamped at the clamping opening.

4. The clamping device of claim 1, characterized in that the inner peripheral face of the outer wall is provided with a recessed circumferential groove, the expansion sleeve is embedded in the circumferential groove, an inner peripheral face of the expansion sleeve is coplanar with the inner peripheral face of the outer wall located at the upper portion of the circumferential groove, and sliding fit of inner and outer cylindrical surfaces is formed between the inner peripheral face of the expansion sleeve and an outer peripheral face of an enclosure wall of the lower cavity; and the inner peripheral face of the outer wall located at the lower portion of the circumferential groove is recessed relative to the inner peripheral face of the expansion sleeve, a lower end of the enclosure wall of the lower cavity extends outwards in the radial direction to form an annular convex edge, and an outer peripheral face of the convex edge is attached to the inner peripheral face of the outer wall at the lower portion of the circumferential groove such that the convex edge is limited below a lower end face of the expansion sleeve.

5. The clamping device of claim 1, characterized in that the outer wall comprises a lower housing and an upper housing that are connected in a vertically superposed manner, and parting surfaces of the lower housing and the upper housing are located between an upper end face and a lower end face of the expansion sleeve.

6. The clamping device of claim 1, characterized in that the outer peripheral face of the cylindrical portion of the support cylinder is sleeved with an annular seal ring, and the periphery of the annular seal ring is sealingly in contact with the inner peripheral face between the lower sections of the peripheral wall of the lower cavity.

7. The clamping device of claim 1, characterized in that an expansion chamber is enclosed between one side of the outer peripheral face of the expansion sleeve and the inner peripheral face of the outer wall, the outer wall of the base is provided with a communication port in communication with the expansion chamber to introduce or discharge a fluid into or out of the expansion chamber so as to expand or contract the expansion sleeve.

8. The clamping device of claim 7, characterized in that the expansion sleeve is made of an elastic material, the expansion sleeve is of an annular structure, the axial middle portion of an outer surface thereof is recessed to form an annular groove, and the expansion chamber is defined between the annular groove and the inner peripheral face of the lower cavity.

9. A machining method, characterized in that the machining method is based on the clamping device as claimed in claim 1 and comprises:

clamping the part at the clamping opening between the locking member and the blind rivet; and performing one or more clamping adjustment operations adapted to part machining deformation during machining, wherein the implementation of the clamping adjustment operations is: loosening the locking member and then moving the support cylinder upwards to compress the elastic member supported thereon such that the blind rivet is in a relaxed state allowing deformation of the part; and according to the deformation state of the part, adjusting the posture of the blind rivet such that the upper surface of the blind rivet is in contact with the surface of the deformed part, and then clamping the part again by using the locking member.

* * * * *